United States Patent [19]

Freudenschuss et al.

[11] 4,179,713
[45] Dec. 18, 1979

[54] METHOD AND EQUIPMENT FOR THE PRODUCTION OF MULTI-CHANNEL SOUND SIGNAL

[75] Inventors: Otto Freudenschuss; Gerd Kittag, both of Vienna, Austria

[73] Assignees: Karl Vockenhuber; Raimund Hauser, both of Vienna, Austria

[21] Appl. No.: 845,674

[22] Filed: Oct. 26, 1977

Related U.S. Application Data

[63] Continuation of Ser. No. 677,123, Apr. 15, 1976.

[30] Foreign Application Priority Data

Apr. 18, 1975 [AT] Austria .................................. 3012/75

[51] Int. Cl.² .......................... G11B 5/43; G11B 5/02
[52] U.S. Cl. ...................... 360/27; 360/28; 360/67
[58] Field of Search ................. 360/26, 27, 28, 24, 360/18, 4, 22, 67, 68; 179/100.4 D, 100.4 ST, 100.41 K, 100.1 TD

[56] References Cited

U.S. PATENT DOCUMENTS

| | | | |
|---|---|---|---|
| 2,481,576 | 9/1949 | DeBoer | 179/100.1 TD |
| 3,452,161 | 6/1969 | Hatter | 360/26 |

*Primary Examiner*—Vincent P. Canney
*Attorney, Agent, or Firm*—Fleit & Jacobson

[57] ABSTRACT

A method and apparatus for the recording and reproduction of an audio signal for multi-channel play-back in which both a monaural signal and a code signal are recorded on a magnetic tape, the recorded code signal having characteristics in accordance with the selective feeding of the audio signal to the various channels together with an adjusting device through which the code signal is controlled to thereby control the distribution of the audio signal throughout the multi-channel reproduction apparatus during multi-channel reproduction of the audio signal.

4 Claims, 5 Drawing Figures

METHOD AND EQUIPMENT FOR THE PRODUCTION OF MULTI-CHANNEL SOUND SIGNAL

This is a continuation of application Ser. No. 677,123, filed Apr. 15, 1976.

BACKGROUND OF THE INVENTION

The invention concerns itself with a method for the production of a multi-channel sound signal by means of sound-recording and reproducing apparatus.

In addition, the invention has to do with the apparatus for the recording and/or reproduction of sound signals in accordance with the aforementioned method, using a sound carrier and associated reproducing and-/or recording devices, wherein a first information band has been assigned to one sound signal, together with a control device that supplies the sound signal to the various output channels, in accordance with the control parameters of the code signal or signals.

It has been suggested earlier to apply control tracings to a tape-like recording carrier, these control tracings being used to control automatic regulating systems for the sound reproduction. These control tracings are determined by various frequencies. When the recording carrier is scanned, the control signals give impulse to resonance circuits which will then regulate the sound volume, the light intensity for the projection of a movie film, or the sound quality.

In addition, a method is already known for a stereophonic sound recording and/or sound transcription, in accordance with which a one-channel sound signal may be admixed with a sound recording that has already been completed, e.g., on two tracks on a magnetic tape. The first sound signal that has been recorded in two tracks will then be heard sterophonically during the reproduction. If the amplitudes of the monaural signal in the individual track positions were chosen so as to be different and when the single-channel or monaural signal was admixed to the two channels of the stereophonic signal, when the entire sound signal is produced, there will be an effect making it possible to locate the admixrf monaural sound signal, e.g., between the two loudspeakers connected to the reproducing equipment. For that reason, the monaural signal may be assigned for its reproduction to any chosen location between the loudspeakers of the reproducing equipment following the setting of the ratio of amplitudes during the recording of the monaural signal.

This known method has the disadvantage in that basically the recording equipment must be designed in such a way that a multi-channel recording of sound signals is possible. To that end, the equipment of both recording channels and reproducing channels has to be designed in a completely homogeneous way so as to make possible an unbiased spatial reproduction of sound signals. The recording carrier must in this method, as a matter of course, permit a homogeneously qualitative storage of sound signals in both tracks. Beyond that, it can hardly be expected from a sound movie amateur that he should prepare several interim transcripts in order to make possible the localization of a sound event, as is absolutely required by the last-named method. Lastly, the recording carrier manufactured in accordance with the known method can hardly be replayed on an instrument that has single-channel reproducing equipment only, since it may happen that essential parts of the sound information are stored in other tracks that cannot be scanned by this instrument.

SUMMARY OF THE INVENTION

Therefore, the invention centers on the problem of creating a method and/or device making it possible, in a simple way, to attribute a local assignment to any sound information, or to a similar factor, during reproduction. In addition, it should be possible at all times to effect the reproduction of a piece of information also by means of those instruments that are not capable of localizing a sound event without at the same time suffering a loss of quality in the condition of the sound information.

The invention, therefore, proposes that, in a method of the type mentioned at the outset, a monaural signal be recorded on a magnetic track, and that a code signal that is specific for the assignment of the sound signal to the individual channels be generated as a second step while at the same time, the parameters of the signal that are specific for assignment to the individual channels, are modified at will by means of a control device, and while preferably the monaural signal as well as the code signal is supplied to a multi-channel reproduction instrument operating in parallel, and the sound signal is reproduced by it in several channels.

This means that, in accordance with the method of the invention, the recording of the sound event and/or of the sound signal is not modified and/or affected in any way. Only when this signal is reproduced by multi-channel reproduction devices does the code signal effect a control of the sound volumes of the reproduction of each individual channel.

When, for example, a noise is emitted at the same volume of sound, by way of the loudspeakers, which have been arranged at a distance, of two pieces of reproduction equipment, the noise appears to the listener to be midway between the two loudspeakers. However, the sound volume of either reproducing channel may be varied at will by modifying a parameter of the code signal. This means that it is possible to accomplish, by storage of the code signal during reproduction, that the noise or similar factor may be assigned to any desired location between the two loudspeakers.

However, when the recording carrier is played back by means of a reproducing instrument that has not been provided with devices for the application of the aforementioned method, the sound information is reproduced in a non-directional manner. The fact that the code signal has not been scanned and used, has no effect on the quality of the acoustic information.

For the application of the method, it is proposed in accordance with the invention, in the case of equipment of the type mentioned at the outset, that a generator be provided for each code signal, as well as one or several adjusting devices for modifying at will the control parameters of each code signal that are specific for the assignment of the sound signal to the various output channels while each code signal may be recorded on the second track of the sound carrier in a way that is familiar per se.

It is possible owing to the disposition of the adjusting device for the modification of the parameters of the code signal, in an advantageous manner, to assign different local fixations to sound signals, noises, and to similar phenomena that differ as to their time sequence. In that way, with the aid of the invention, it is possible to reproduce the monaurally recorded noise of a railway train in such a way that the direction of the passing train can be identified by the listener, during the reproduction, without question.

BRIEF DESCRIPTION OF THE DRAWINGS

The invention has been shown in the drawings by several embodiments of the invention.

DESCRIPTION OF THE PREFERRED EMBODIMENT(S)

Figure 1:
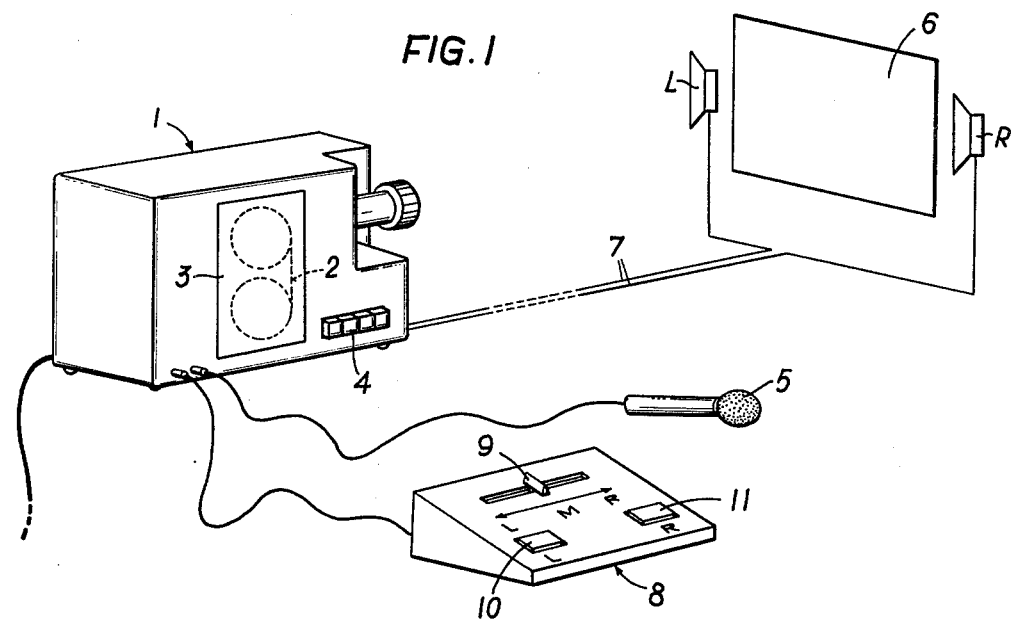
FIG. 1 shows a sound film projector equipped for the recording and reproduction of sound signals that can be fixed as to their location.

In FIG. 1, 1 designates a movie projector equipped for sound recording and sound reproduction onto and from 8mm films having one magnetic track. The motion-picture film 2 is stored in a cassette 3 which is located in a cassette compartment of the projector 1. For the operation and/or activation of the various devices, such as a film drive, recording amplifier, reproduction amplifier, the keys 4 have been provided.

For the recording of sound signals, the microphone 5 is connected with the projector. For the reproduction of the sound signals, two loudspeakers, L and R, have been provided, arranged left and right of the projection screen 6. The signal voltage is fed to the loudspeakers L and R through leads 7.

Identical sound volumes on the two loudspeakers L and R of the sound signal that is homogeneous per se, give a listener who is placed essentially midway between the two loudspeakers L and R, the impression that the sound reproduced by the loudspeakers L and R, emanates from the center of picture screen 6. On the other hand, different sound volumes on the loudspeakers L and R have the effect of fixing the should reproduced in a location off the center of projection screen 6. The location will then be determined by the amplitude ratios of the signalvoltages on the two loudspeakers L and R.

The effect described above may, therefore, be used "acoustically" to add a localization of a sound-producing object arranged or reproduced anywhere within the projection screen. This contributes largely to a faithful reproduction of a sound motion picture film.

Control device 8 which is connected with the projector 1 by a cable has been provided to regulate the sound volumes on the two loudspeakers L and R. For example, in order to be able to store the setting of the sound volumes during a sequence of a sound motion picture for later reproduction, control device 8 and the motion picture projector 1 have been designed in such a way that by manipulation of control device 8, a code signal with variable parameters may be stored on an additional magnetic track of the motion-picture film. This code signal will then be used during the reproduction of the motion-picture film to control and/or modify the sound volumes in the individual loudspeakers. This control device has, for the shaping of the code signal, a regulating device 9 that can be adjusted manually and lowers and raises, depending on its position, the signal of one or the other loudspeaker L, R, away from the center. Two keys 10 and 11 which likewise can be actuated manually, are mounted on the control device 8, to enable a quick setting of the different sound volume of loudspeaker R or loudspeaker L. Actuation of one of the two manual keys 10 and 11 produces a high sound volume in loudspeaker L and a low sound volume in loudspeaker R and or vice versa. Consequently, when either one of keys 10 or 11 is actuated, the sound event will essentially always be assigned to one picture edge. Keys 10, 11 may advantageously be designed as contact keys to make for easy manipulation.

Figure 2:
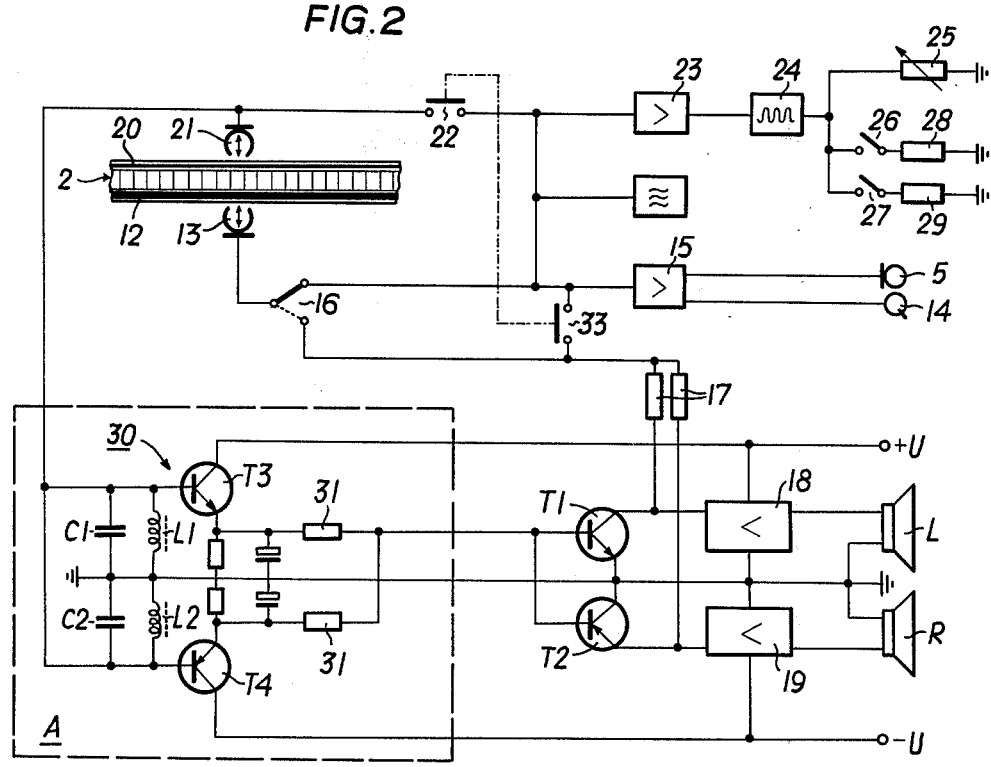
FIG. 2 is a schematic drawing presenting a block diagram showing the circuitry of a movie projector in accordance with FIG. 1.

The electronic circuit of such a control device 8 is shown in the schematic drawing of FIG. 2 in connection with the recording and reproduction equipment of motion-picture projector 1.

In accordance with FIG. 2, a magnetic track 12 has been dubbed onto motion-picture film for the storage of language signals, music signals, and noise signals. A sound head 13 has been assigned to this sound track 12 for the recording and reproduction of the stored information. Microphone 5 or another source of sound 14 is connected with the recording amplifier 15. The output of the recording amplifier 15 leads via reversing switch 16 to the sound head 13. The inputs of two reproduction amplifiers 18, 19 are connected to the additional outlet of the reversing switch 16 by way of decoupling resistances 17 for the reproduction of the information stored on magnetic track 12. Loudspeakers L, R are connected with the output of the reproduction amplifiers.

By means of a device (not shown) regulating the sound volume, the sound volume of the reproduction may be set on both amplifiers 18, 19 jointly. In order to achieve the effect of assigning to the sound event an adjustable direction and/or local fixation, the signal voltage of the sound head 13 is supplied to each reproduction amplifier 18, 19 via an adjustable voltage divider. This voltage divider consists of decoupling resistances 17 and of the collector-emitter segment of transistors T1 or T2, respectively.

The resistance value of the collector-emitter segment of transistor T1 or T2 may be set by a direct voltage on the base of each transistor. In the example of the embodiment in FIG. 2, transistors T1 and T2 are of opposite conduction types. The application of a positive voltage to the base of the "NPN" transistor T1 brings about a reduction of the sound volume on loudspeaker L. The application of a positive voltage to the base of "PNP" transistor T2 causes its emitter-collector segment to be blocked and thereby raises the sound volume on loudspeaker R. A negative voltage to the bases of transistors T1, T2 causes, consequently, an increase of the sound volume on loudspeaker L and a reduction of the sound volume on loudspeaker R. Accordingly, the ratio of the sound volumes on loudspeakers L and R depends on the polarity and also on the amount of the voltage applied to the bases of transistors T1, T2.

To obtain the control voltage for the bases of transistors T1, T2 during the reproduction of a motion-picture film, an alternating-current signal is stored as a code signal on an additional magnetic track 20 of the motion-picture film 2. To that end, an additional sound head 21 has been assigned to magnetic track 20 which sound head is connected with the output of a recording amplifier 23 via a contact switch 22. A signal generator 24 is connected to the input of the recording amplifier 23. The frequency of the signal generator 24 may be modified and adjusted at will by adjusting 25 or by the switches 26, 27.

The adjusting device 25 may be actuated by means of handle 9 as shown in FIG. 1. The contact switches 26, 27 may also be operated by means of the devices 10, 11, in accordance with FIG. 1. As described earlier in regard to FIG. 1, the actuation of adjusting device 25 and of the contact switches 26, 27 brings about a modification of the local assignment of a sound event off the center of the base as provided by picture screen 6. Within the circuit of the contact switch 26, resistance 28 has been provided and within the circuit of switch 27, resistance 29 is provided. In accordance with the value of these resistors 28, 29, the signal generator 24 oscillates upon actuation of the appropriate contact switch at a frequency of either F1 or of F2. When the handle 9 of the adjusting device 25 is in the middle position, the signal generator 24 oscillates at a frequency of F0.

The frequency of the code signal is the criterion for setting the sound volume on the loudspeakers L, R. When the code signal has a frequency of F1, the sound volume on loudspeaker R is reduced considerably. On the other hand, when the code signal has a frequency of F2, the sound volume on loudspeaker L is reduced considerably. The setting of an intermediate frequency between the two frequencies F1 and F2 always leads to definite sound-volume ratios on loudspeakers L, R which will then make it possible to locate the sound event along the base segment between the loudspeakers L and R, the frequency of F0 being the center of the base segment. This code signal can be picked up by the sound head 21 during the reproduction of the motion picture film. The code signal then proceeds from the sound head 21 to a discriminator 30 which converts the frequency of the code signal into a direct voltage of a definite amount and polarity for the control of the bases of transistors T1 and T2.

At its input, the discriminator 30 has paralled oscillatory circuits either one of which consists of an inductance L1 and of a capacitor C1 or of L2, C2, respectively. The oscillatory circuit L1, C1 has a resonance frequency of 2,800 cycles while the second oscillatory circuit L2, C2 is tuned to a resonance of 3,600 cycles. When the code signal has a frequency of 3,200 cycles, both oscillatory circuits react with amplitudes of the same value at the central position of the adjusting device 25. When the frequency of the code signal is modified in the direction of the resonance frequency of circuit L1, C1, its amplitude increases while the amplitude of the second circuit L2, C2 decreases. When the frequency of the code signal approaches the resonance frequency of circuit L2, C2, these modifications of amplitude will take place in the reverse sense. The voltages on the oscillatory circuits are decoupled by way of the transistors T3 and/or T4 constituting emitter followers. There is always only one voltage on the emitter of transistor T3 during the positive half-waves of the oscillatory circuit L1, C1, inasmuch as transistor T3 is an "NPN" type of conduction. The voltages of the oscillatory circuit L2, C2 are available to be tapped at all times during the negative half-waves on the emitter of transistor of the T4 "PNP" or "NPN" type. The electrolytic condensor, not designated in any great detail, on the emitters of transistors T3, T4 are used as signal storage units for the information intervals. When the median frequency of 3,200 cycles is transmitted, the emitter voltages of the transistors T3, T4 are at the same level. However, since they have opposite polarity, they cancel each other after their being coupled via resistances 31. As the transmitted frequency of the resonance frequency approaches either one of the oscillatory circuits L1, C1 and L2, C2, respectively, the emitter potential of the corresponding transistor T3 or T4 will be at a greater magnitude. Depending on the approach of the frequency of the code signal to either one of the resonance frequencies of the two oscillatory circuits, the voltage on the pick-up 31, therefore, changes in magnitude and potential. When there is no code signal at the input of discriminator 30, the direct potential at the output or the control voltage for transistors T1, T2 is equal to zero. Consequently, the two reproduction amplifiers 18, 19 are controlled by means of signal voltages of the same magnitude.

The assignment of a directional component of a sound event is made advantageously only after the finishing of the recording of the sound event. When the picture content is then observed on picture screen 6, it will be easy to decide how the code signal and/or the sound volumes on loudspeakers L and R shall be modified directionally. The modification will then be carried out by actuating the adjusting device 25 or the contact switches 26, 27.

Of course, it is possible also to provide a local assignment to a sound event immediately during the recording, i.e., during the dubbing of the motion picture film, with the aid of projector 1 in accordance with FIG. 1. To that end, the contact 32 has been provided which connects the output of recording amplifier 15 with the inputs of the reproduction amplifiers 18, 19. The handle for the actuation of the contact switch 32 may advantageously be connected to the contact switch 22 in the electric circuit of the sound head 21.

Figure 3:
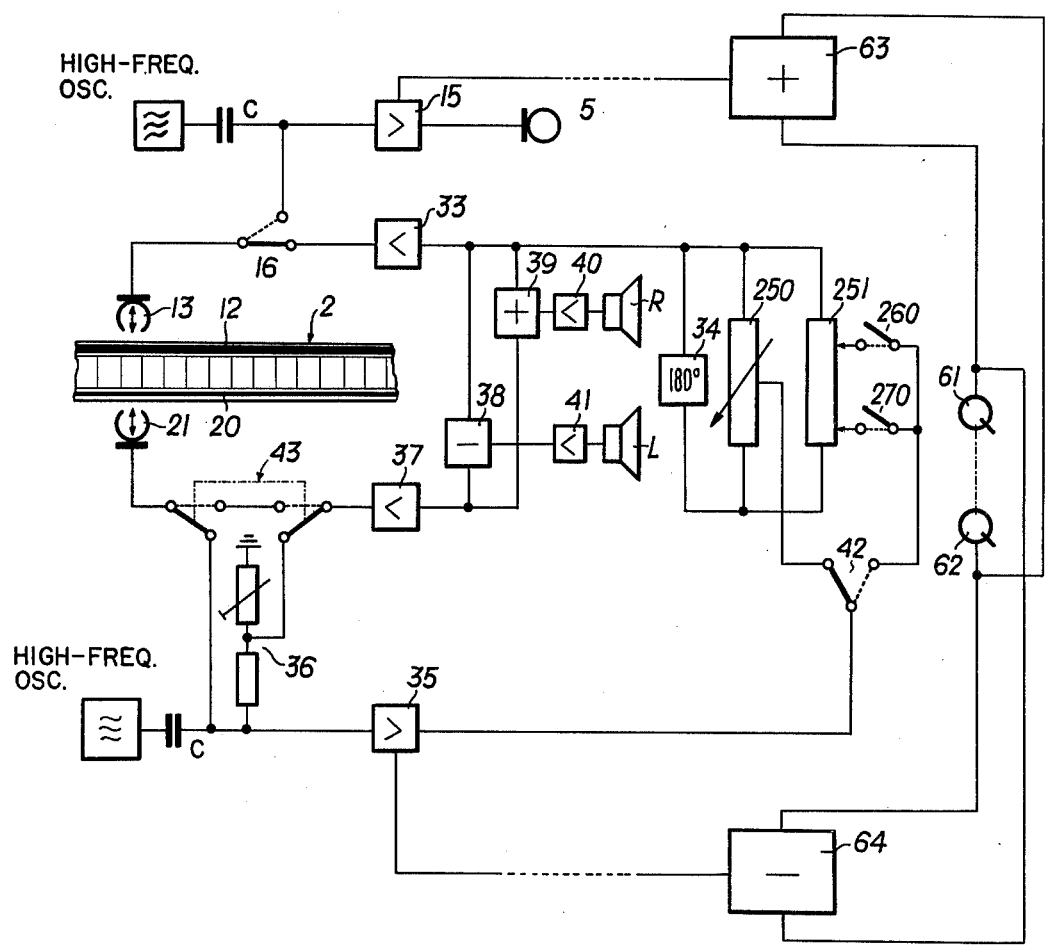
FIG. 3 shows an additional embodiment of schematic circuitry of a movie projector in accordance with FIG. 1.

In FIG. 3, there is shown another embodiment of the invention wherein two sound heads 13, 21 have been assigned to the motion-picture film 2 provided with magnetic tracks, 12, 20. For example, noises recorded with the aid of a microphone 5 are conveyed to the sound head 13 by way of recording amplifier 15 and the contact switch 16 while the sound event is stored on the magnetic track 12. A reproduction amplifier 33 has been connected by way of the contact switch 16, that has been designed as a reversing switch, for the reproduction of the acoustic information stored on the motion-picture film. A phase-reverser stage 34 has been connected to the output of reproduction amplifier 33 in such a way that the output of the latter amplifier and the output of phase-inverter stage 34 are connected to the regulating device 250. Depending on the setting of this regulating device 250, the signal of the sound head 13 may be picked up at its output at the desired level.

The signal picked up at the regulating device 250 is supplied, by way of a recording amplifier 35, to the sound head 21 that is associated with the additional magnetic track 20 of the motion picture film 2. At the same time, the output signal of the recording amplifier 35 is supplied, by way of the voltage divider 36, to a second reproduction amplifier 37.

The inputs of a subtraction stage 38 and the inputs of an addition stage 39 are connected with the outputs of the reproduction amplifiers 33 and 37. The outputs of these two stages 38, 39 are connected with the inputs of the low-frequency output stages 40, 41 to which the two loudspeakers R and L are connected respectively.

The function of the circuit in accordance with FIG. 3 shall be explained by way of an example wherein a sound signal X has been stored on track 12. When this signal is reproduced, the signal X may then be picked up at the output of the reproduction amplifier 33. The signal −X may be picked up at the output of the phase-inverter stage 34. This means that with the aid of the adjusting device 250, a signal having a level which may be +X, −X, or any desired relationship between those two values, may be supplied to the recording amplifier 35 and/or to the sound head 21. When the signal +X has been stored on magnetic track 12 and when the signal +X is stored similarly in an additional recording step on magnetic track 20, it is readily seen that following the amplification of these signals in amplifiers 33 and 37 at the output of the addition stage 39, the signal 2X will be supplied to the loudspeaker R by way of output stage 40. However, the output signal of the subtraction stage 38 is equal to zero and the loudspeaker L will not emit any signal.

When the signal +X has been stored on magnetic track 12 and when in an additional recording step, the signal −X is stored on magnetic track 20, conversely no signal will appear at the output of the addition stage 39. Still, the signal 2X may be picked up at the output of the subtraction stage 38 and will be supplied to the loudspeaker L by way of output stage 41.

This means that, by setting the regulating device 250, the sound volume of the signals on loudspeakers L and R can be regulated and stored, in a simple way, by selection of the phase relationships of the signals from the sound head 21. The local assignment of a sound event is stored on the motion-picture film itself, without in any way adversely affecting the sound information on magnetic track 12.

Furthermore, in order to be able to bring about a rapid change of the local assignment of the sound event, an additional device 251 has been assigned to the regulating device 250 and the device 251 supplies a signal having predetermined levels to the recording amplifier 35 by way of the contact switches 260 and 270. The reversing switch 42 connects alternately the recording amplifier 35 with the output of regulating device 250 or with the outputs of the regulating device 251.

In addition, it is also possible in accordance with the circuitry shown in FIG. 3 to make a genuinely stereophonic recording, i.e., a recording on two tracks in which the monaural signal e.g. "X" in a chosen phase relationship, is superimposed on track 20. To that end, the signals Y, Z of a two-channel sound source 61, 62 are supplied on the one hand to the addition stage 63 and on the other hand to the subtraction stage 64. The output of the addition stage 63 that is the signal Y+Z, is supplied to an input of the recording amplifier 15. The output of the subtraction stage 64 that is the signal Y−Z, is supplied to the input of the recording amplifier 35. Signals stored in this way will again be separated into the stereophonic signals Y and Z during their reproduction by the addition stage 39 and the subtraction stage 38, and supplied for emission to the assigned loudspeakers R and L.

Such recordings of sound signals, X and Y, Z can be made with the aid of a so-called "trick diaphragm" which has been assigned to each recording amplifier 15, 35, this sound mixing control making it possible, as is well known, to record a second signal without erasing the first signal that had been stored earlier.

The phase-inverter stage 34 may be a simple transistor amplifier stage whose amplification has been selected as "one".

The regulating device 250 can be a potentiometer of which the terminals have been connected to the collector and to the emitter by way of condensors. In that case, the pick-up of the potentiometer must be connected to the input of recording amplifier 35. The regulating device 251 can consist of a series arrangement of individual resistances and the contact switches 260, 270 must be connected to taps of the resistance series.

The reversing switches 43 shown in FIG. 3 have been provided for switching the magnetic head 21 from recording to reproduction.

Figure 4:
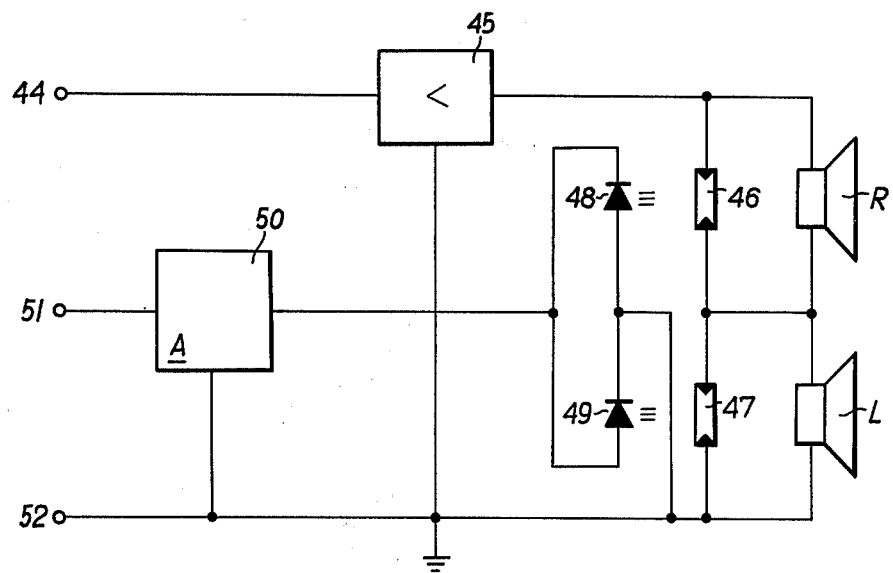
FIG. 4 shows details of reproduction and recording apparatus.

In FIG. 4, a switching arrangement is shown schematically. Accordingly, it is possible to supply current from one single low-frequency amplifier to two loudspeakers which have been arranged in series. However, in this case the sound volume of loudspeaker R or the other loudspeaker L may be influenced, depending on a control signal by the output signal of the discriminator, as in FIG. 2. The signal from a play-back head is supplied to the low-frequency amplifier 45 at terminal 44. The loudspeakers R and L are connected in series with the output of reproduction amplifier 45. Photoelectric cells 46, 47 are provided in parallel with each loudspeaker R, L. A light source such as luminous diodes 48, 49, has been assigned to the photosensitive surface of each photoelectric cell 46, 47. The luminous diodes 48, 49 have been connected in series and the ground voltage has been applied to the anode of luminous diode 48 and to the cathode of luminous diode 49, respectively. The cathode of luminous diode 48 and the anode of luminous diode 49, respectively, are connected with the output of discriminator 50. This discriminator is essentially as it is shown in detail A of FIG. 2. The code signal for influencing the sound volume is supplied to the discriminator at terminal 51. Terminal 52 is at the ground voltage.

The sound volumes of loudspeakers R, L are influenced as a function of the output signal of discriminator 50. If the output signal of discriminator 50 has positive polarity, the luminous diode 49 emits light in accordance with the amount of the voltage. In other words, photoelectric cell 47 has an extremely small resistance value. This means that loudspeaker L will be short-circuited, or nearly so. If, however, the output signal of the discriminator has negative polarity, the sound volume of loudspeaker R is influenced correspondingly.

The arrangement in accordance with FIG. 4 makes it possible to use a motion-picture projector with a single sound-reproduction amplifier and nevertheless achieve local assignment for a sound event. Such an arrangement may be produced advantageously without the output amplifier 45 has an accessory device for a sound movie projector. The terminals 44 and 52 need simply be connected with the output of the sound projector. Terminal 51 may, in the case of a two-format projector, be connected with the sound-film head for a standard 8 mm format when the film to be played has super-8 format.

Figure 5:
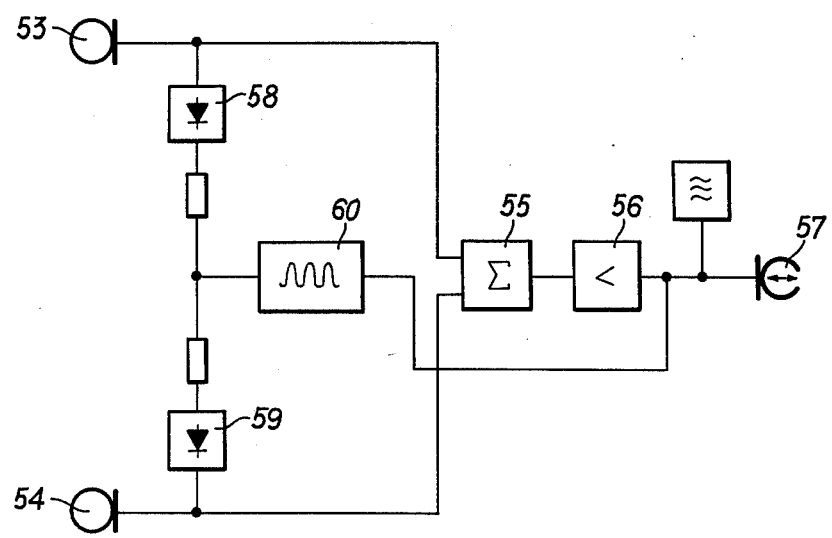
FIG. 5 shows details of recording apparatus.

Lastly, FIG. 5 is a schematic drawing of a circuit for a sound movie camera in which the sound information, such as noises, conversations, music, etc., are recorded on one single magnetic track. Two microphones 53, 54 have been provided to record the sound events. These microphones are connected with a summation amplifier 55, its output signal being supplied to a recording amplifier 56. The output of the recording amplifier 56 leads to the recording head 57. It is a well-known fact that a sound event generates different signal voltages on two microphones that have been set up separately. When these signal voltages are transformed into a single signal, this signal may be considered to be a parameter of the local assignment of the sound event within the range of the microphones. In accordance with FIG. 5 and with this in view, the signal voltages of microphones 53, 54 in the stages 58, 59 are rectified and united by way of decoupling resistances. The signal obtained at the resistances is supplied, as a control signal, to a code signal generator 60, the output of which is likewise connected with the terminal of the recording head 57.

When recordings are made with a sound film camera equipped in this way, not only is the sound information stored on the magnetic track of the film but also a code signal, the nature of which is determined by the position of the sound event.

For the recording of the signals, the frequency bandwidth of the magnetic track is divided into three ranges: a frequency band for the storage of the sound signals (from 100 cycles to 10 kilocycles) and a frequency band below (approximately 20 cycle to 100 cycles) as well as a frequency band above (approximately 10 key to 12 key) the sound-signal frequency band for the storage of the code signal or signals.

Now, it will be necessary in the case of reproduction by a sound projector to filter out the code signal before first reproducing the signal via the loudspeaker and, if need be, to feed it to a sound-volume control device for the reproducing equipment.

This means that it is possible, by means of the circuit in accordance with FIG. 5, to impart to the sound events stored a local assignment during reproduction with the aid of a sound film camera which, as such, is equipped only for the monaural reproduction of the sound film.

Basically, the code signal will be stored on the track of the sound information only when the shaping of the code signal is carried out at the time of the recording of the sound. This may be done, therefore, in "live-sound" ("Liveton") cameras. If one already has a sound recording, however, it is much more advantageous to inscribe the code signal on a separate track since only by this method is it possible to effect a repetition or correction of the local assignment.

In addition, it is conceivable to arrange loudspeakers not only on both sides of the picture screen but also to arrange one or several loudspeakers behind the viewers, perhaps within the range of the projector. The sound volume of the loudspeakers is controlled by an additional stored code signal, or by a specific parameter of one single code signal. In that way, the spatial effect of sound reproduction may be improved considerably, since it is possible thereby to reproduce acoustically also movements between the picture screen and the viewers.

What is claimed is:

1. A method for converting a single channel sound signal which has been recorded on a first sound track of a recording medium into at least a two channel stereo sound signal, comprising the steps of:
   reproducing said single channel sound signal from said first sound track,
   deriving a second sound signal by changing the phase of said reproduced single channel sound signal,
   recording said second sound signal on a second sound track of the recording medium,
   reproducing simultaneously said single channel sound signal from said first sound track and said second sound signal from said second sound track,
   feeding said reproduced single channel sound signal and said reproduced second sound signal to an addition stage and a substraction stage, each of said stages producing an output signal, and
   introducing one of said output signals into a first playback channel corresponding to one of said two stereo channels and introducing the other of said output signals into a second playback channel corresponding to the other of said two stereo channels.

2. The method of claim 1 wherein the step of deriving a second sound signal further includes the step of altering the amplitude of said reproduced single channel sound signal.

3. Apparatus for converting a single channel sound signal which has been recorded on a first sound track of a recording medium into at least two sound signal channels, said apparatus comprising, in combination:
   a first sound head means arranged for operation in relation to said first sound track,
   first amplifier means connected to receive said first sound head signal for producing an amplified first sound signal therefrom,
   phase shifting means connected to said first amplifier means for producing a second sound signal representing said first sound signal shifted in phase,
   control means connected to said phase shifting means for controlling the relative amount of phase shift between said second sound signal and said first sound signal,
   second sound head means connected to receive said second sound signal from said phase shifting means and being arranged selectively to record or to reproduce said phase shifted signal,
   second amplifier means connected to receive said reproduced second sound signal for producing an amplified second sound signal therefrom,
   addition stage means having first and second inputs, said first input connected to receive said amplified first sound signal,
   subtraction stage means having first and second inputs, said first input connected to receive said amplified first sound signal, and
   changeover switch means connected to said amplified second sound signal and to said second input of said addition stage and to said second input of said subtraction stage for alternatively connecting said second sound signal to said addition stage or to said subtraction stage, whereby the output of said addition stage means is fed to a first playback channel and the output of said subtraction stage means is fed to a second playback channel.

4. The apparatus of claim 3 further comprising:
   attenuating means connected to receive said first sound head signals and connected to said control means for producing an output signal representing said first sound head signal attenuated by an amount determined by said control means.

* * * * *